(12) United States Patent
Hirose et al.

(10) Patent No.: US 7,095,199 B2
(45) Date of Patent: Aug. 22, 2006

(54) AUTOMATIC VEHICLE WIPER SYSTEM

(75) Inventors: Motohisa Hirose, Saitama (JP); Takashi Kondo, Kawachi-gun (JP); Masaaki Nakai, Sakura (JP); Taizo Kikuchi, Utsunomiya (JP)

(73) Assignee: Honda Motor Co., Ltd., (JP)

( * ) Notice: Subject to any disclaimer, the term of this patent is extended or adjusted under 35 U.S.C. 154(b) by 0 days.

(21) Appl. No.: 11/225,316

(22) Filed: Sep. 12, 2005

(65) Prior Publication Data

US 2006/0055354 A1     Mar. 16, 2006

(30) Foreign Application Priority Data

Sep. 14, 2004   (JP)  ............................ P2004-266643

(51) Int. Cl.
*H02P 1/04*     (2006.01)

(52) U.S. Cl. ...................... 318/444; 318/443; 318/483; 318/487; 318/2

(58) Field of Classification Search ........... 15/250.001, 15/250.12, 250.13, 250.2, 250.3, 250.31, 15/118; 318/DIG. 2
See application file for complete search history.

(56) References Cited

U.S. PATENT DOCUMENTS

| | | | | |
|---|---|---|---|---|
| 4,584,508 A | * | 4/1986 | Kobayashi et al. | 318/483 |
| 5,117,168 A | * | 5/1992 | Nomura et al. | 318/444 |
| 5,119,002 A | * | 6/1992 | Kato et al. | 318/444 |
| 5,453,676 A | * | 9/1995 | Agrotis et al. | 318/643 |
| 5,780,719 A | * | 7/1998 | VanDam | 73/29.01 |
| 5,809,609 A | * | 9/1998 | Shin | 15/250.12 |
| 5,847,826 A | * | 12/1998 | Fukui et al. | 356/335 |
| 5,896,018 A | * | 4/1999 | Pientka et al. | 318/483 |
| 6,087,795 A | * | 7/2000 | Amagasa et al. | 318/446 |
| 6,121,738 A | * | 9/2000 | Meier et al. | 318/280 |
| 6,153,995 A | * | 11/2000 | Tanaka | 318/483 |
| 6,175,205 B1 | * | 1/2001 | Michenfelder et al. | 318/444 |
| 6,420,845 B1 | * | 7/2002 | Mackel et al. | 318/443 |
| 6,617,813 B1 | * | 9/2003 | Morishita et al. | 318/444 |
| 6,657,410 B1 | * | 12/2003 | Berger et al. | 318/483 |
| 6,703,804 B1 | * | 3/2004 | Courdier et al. | 318/445 |
| 6,851,157 B1 | * | 2/2005 | Zimmer | 15/250.13 |
| 6,864,655 B1 | * | 3/2005 | Schmitt et al. | 318/483 |
| 6,946,639 B1 | * | 9/2005 | Stam et al. | 250/208.1 |
| 6,958,585 B1 | * | 10/2005 | Kim | 318/2 |
| 7,019,275 B1 | * | 3/2006 | Stam et al. | 250/208.1 |

(Continued)

OTHER PUBLICATIONS

Japanese Unexamined Patent Application, Application No. 2003-109184 with an English abstract thereof.

*Primary Examiner*—Bentsu Ro
*Assistant Examiner*—Robert W. Horn
(74) *Attorney, Agent, or Firm*—O'Melveny & Myers LLP

(57) ABSTRACT

An automatic vehicle wiper system including a wiper, a speed sensor which measures vehicle speed, a rainfall measuring device which measures amount of rainfall during predetermined intervals, a calculating device which calculates a wiping action frequency of the wiper as first data, depending on the amount of rainfall measured by the rainfall measuring device, a memory device which stores the first data calculated by the calculating device as second data when the vehicle speed measured by the speed sensor decreases to equal to or less than a predetermined value, and a wiping action frequency determining device which determines the wiping action frequency of the wiper by comparing the first data and the second data when the vehicle speed measured by the speed sensor becomes equal to or greater than a predetermined value after it has been confirmed that the vehicle has stopped.

2 Claims, 4 Drawing Sheets

U.S. PATENT DOCUMENTS

2003/0173923 A1*  9/2003  Nazione et al. ............. 318/447
2005/0285557 A1* 12/2005  Morishita ................... 318/444
2006/0006826 A1*  1/2006  Morishita ................... 318/483
2006/0055354 A1*  3/2006  Hirose et al. ............... 318/444

* cited by examiner

AUTOMATIC VEHICLE WIPER SYSTEM

BACKGROUND OF THE INVENTION

1. Field of the Invention

The present invention relates to an automatic vehicle wiper system.

Priority is claimed on Japanese Patent Application No. 2004-266643, filed Sep. 14, 2004, the content of which is incorporated herein by reference.

2. Description of Related Art

Conventionally, in a vehicle such as an automobile, automatic wiper systems are known that automatically carry out the wiping action of a wiper by using a rain sensor in order to reduce the burden of the vehicle operation on the driver while driving in rain. Rain sensors are known that estimate the amount of rainfall based on the amount of light received when light emitted from a light emitting portion is reflected by the front windshield and made incident on a light receiving portion. The rain sensors are placed in a small field of locations on the front windshield that do not obscure the field of view of the driver (refer to Japanese Unexamined Patent Application, Application No. 2003-109184).

However, the number of raindrops striking the rain sensors is small when the vehicle has stopped in comparison to when the vehicle is traveling. Thus, for example, the rain sensors may determine that the condition is a light rainfall even when the condition is a moderate rainfall, and thereby the wiping action of the wipers is inhibited. When the vehicle starts to move again (accelerate) after having stopped, a predetermined amount of time is necessary in order to estimate an amount of rainfall that corresponds to the actual rainfall conditions. This predetermined amount of time is because of the variance in frequency with which raindrops will strike the rain sensor and the like.

In contrast, a rain sensor may determine that rainfall is heavy even during light rainfall conditions in the case that, for example, the raindrops are concentrated by chance at a location at which rain sensors are provided (even if the rainfall conditions are identical, the variance of frequency of raindrops striking the rain sensor while traveling and while stopped are different). In this case as well, in order to estimate the actual amount of rainfall accurately, a filter may be applied to the sensitivity of the rain sensor.

However, in the structure described above, when the vehicle starts to move again after having stopped, even when the rainfall condition is moderate or greater, the wiping action of the wiper may not be appropriate for the rainfall conditions(for example, the wiper may not carry out the wiping action even though rain is falling), because of the variance in frequency with which the raindrops will strike the rain sensor or because the rain sensor estimates the amount of rainfall through a filter, and thus the driver may experience distress.

Thus, the present invention provides an automatic vehicle wiper system that can carry out a wiping action of the wiper that corresponds to the rainfall conditions even when the vehicle starts to move again after having stopped.

SUMMARY OF THE INVENTION

In order to solve the problems described above, in a first aspect, the present invention provides An automatic vehicle wiper system including a wiper, a speed sensor which measures vehicle speed, a rainfall measuring device which measures amount of rainfall during predetermined intervals, a calculating device which calculates a wiping action frequency of the wiper as first data, depending on the amount of rainfall measured by the rainfall measuring device, a memory device which stores the first data calculated by the calculating device as second data when the vehicle speed measured by the speed sensor decreases to equal to or less than a predetermined value, and a wiping action frequency determining device which determines the wiping action frequency of the wiper by comparing the first data and the second data when the vehicle speed measured by the speed sensor becomes equal to or greater than a predetermined value after it has been confirmed that the vehicle has stopped.

According to this structure, even when the vehicle starts to move again (accelerates) after having stopped, it is possible to perform the wiping action of the wiper by comparing the wiping action frequency of the wiper depending on the amount of rainfall that were measured when a predetermined speed has been reached and a wiping action frequency of the wiper depending on the amount of rainfall when a predetermined speed has been reached that was stored during deceleration before stopping, and selecting the larger one of these.

In addition, in a second aspect of the invention, when the first data and the second data are compared, the wiping action frequency determining device cancels the wiping action frequency based on the second data when the first data shows that there is no rainfall.

According to this structure, in the case in which no rainfall is measured even when the vehicle starts to move again after having stopped, the wiper control is carried out based on the present first data.

According to the inventions disclosed in the first and second aspects, because it is possible to carry out a wiping action of a wiper that corresponds to the actual rainfall conditions even when the vehicle starts to move after having stopped, the driver feels no distress and it is possible to improve the usability of the automatic wiper.

DETAILED DESCRIPTION OF THE INVENTION

Below, an embodiment of this invention will be explained with reference to the figures.

Figure 1:
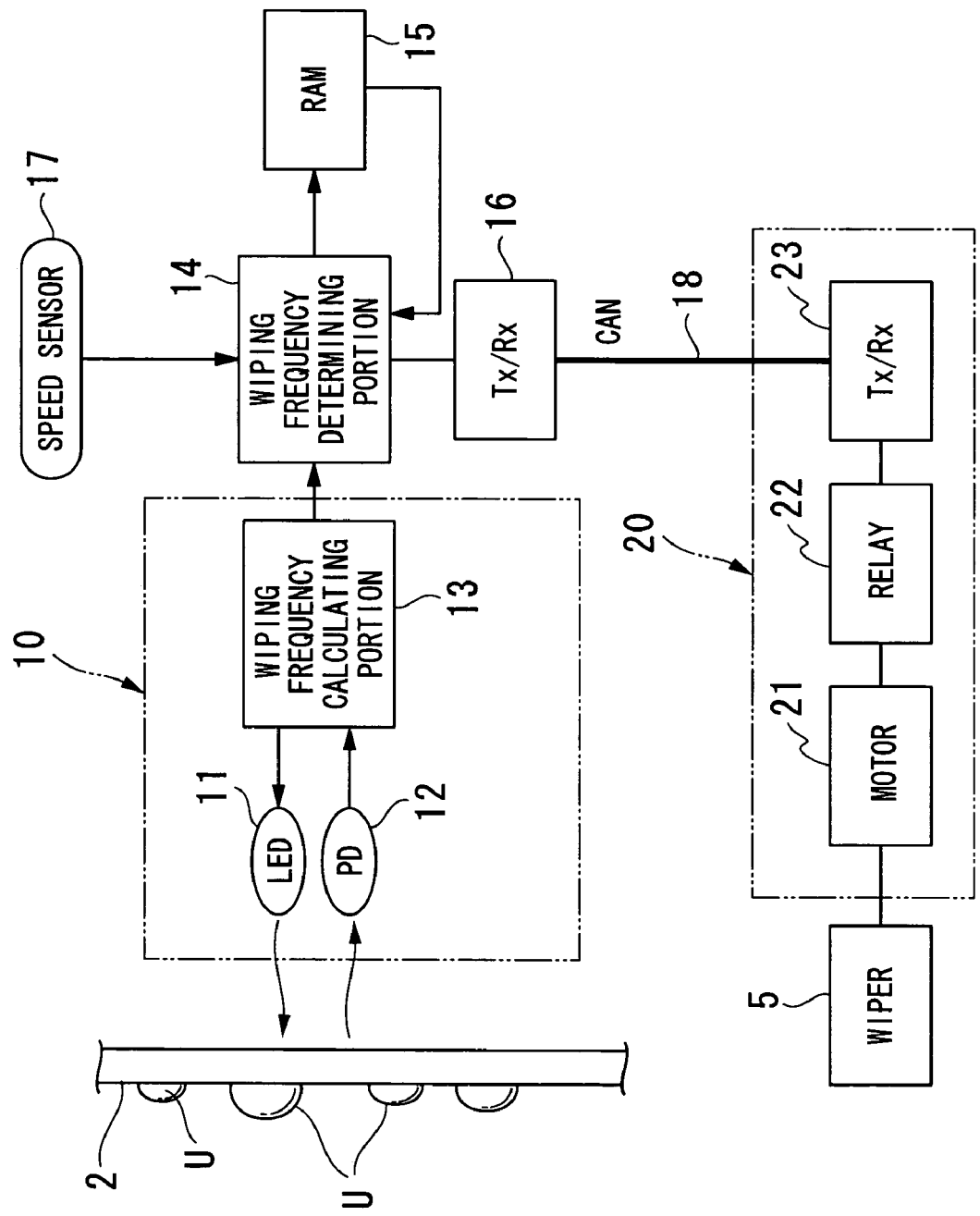
FIG. 1 is a general structural drawing of the automatic vehicle wiper system in an embodiment of this invention.

FIG. 1 is a general structural drawing of the automatic vehicle wiper system according to this invention. As shown in the figure, this system includes a rain sensor (a rainfall measuring device) 10 that detects raindrops precipitating on a front windshield 2 and estimates an amount of rainfall, and a wiper control unit 20 that controls the operation of the wiper 5.

The rain sensor 10 includes a light emitting diode (light emitting element) 11 that emits a light for raindrop detection towards the front windshield 2, a photodiode (light receiving element) 12 that receives the light of the light emitting diode 11 that has been reflected by the front windshield 2, a wiping frequency calculating portion (a calculating device) 13 that estimates the amount of rainfall based on the amount of light received by the photodiode 12 and calculates a wiping action frequency (below, referred to simply as the "wiping frequency") of the wiper 5 depending on the estimated amount of rainfall. This system also includes a wiping frequency determining portion (a wiping action frequency determining device) 14 that evaluates the estimated amount of rainfall and the wiping frequency data at the point in time when the vehicle attains a predetermined speed while accelerating and decelerating by taking into account a vehicle speed measuring signal from the speed sensor 17, and a memory (a memory device) 15 that stores predetermined data which the wiping frequency determination portion 14 has, and a sensor side transceiver 16 that serves as a device for communicating with the wiper control unit 20.

The wiper control unit 20 includes a motor 21 that performs the wiping action of the wiper 5, a relay 22 that forms an intermittent circuit of the motor 12, and a unit side transceiver 23 that serves as a device for communicating with the rain sensor 10. The unit side transceiver 23 and the sensor side transceiver 16 are connected via a CAN (Controller Area Network) 18. In addition, the wiping action of the wiper 5 is performed by controlling the motor 21 based on an instruction signal output from the rain sensor 10.

Figure 2:
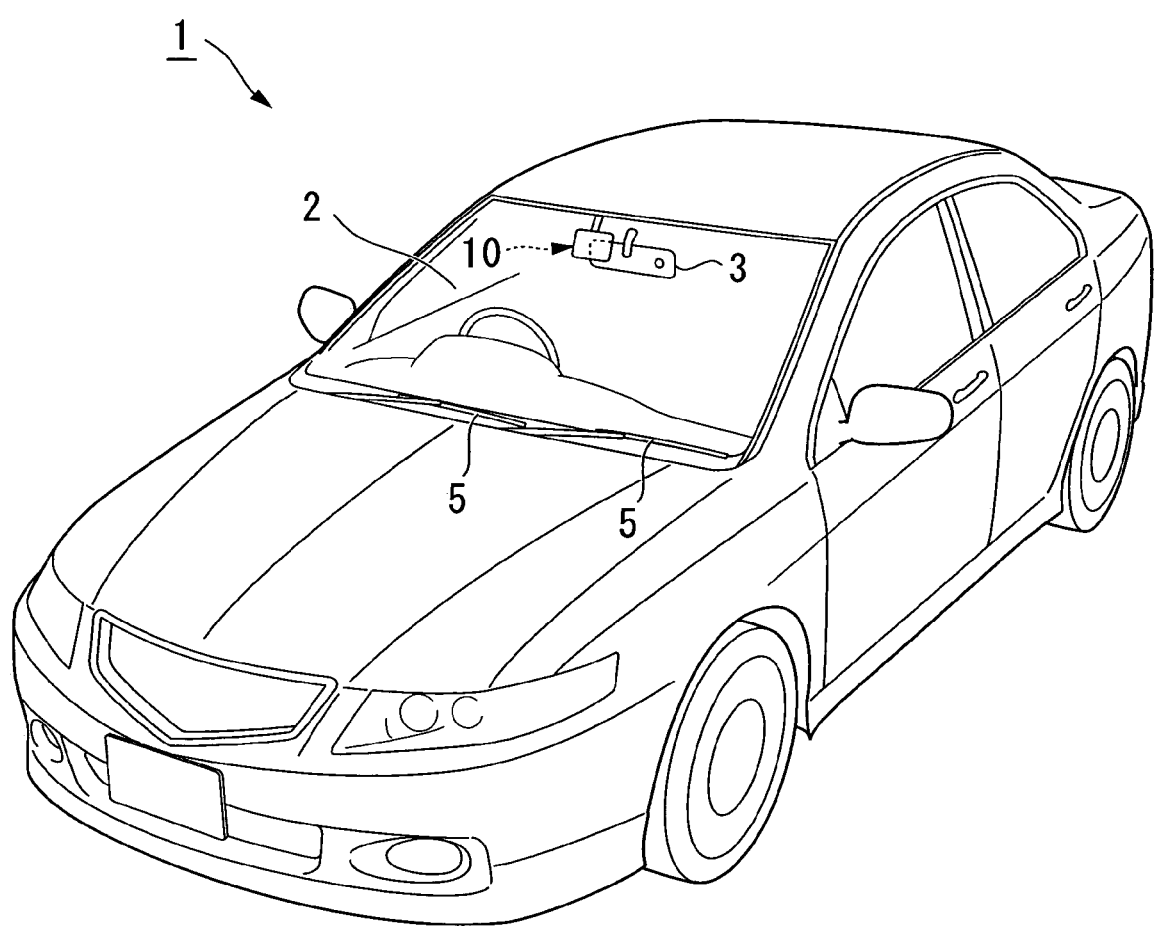
FIG. 2 is a perspective view of a vehicle in which the system described above has been applied.

Here, as seen in FIG. 2, the rain sensor 10 is disposed in front of the rear view mirror 3 in the passenger compartment of the vehicle on the inside of the front windshield 2 of the vehicle.

Such a rain sensor 10 emits light from the light emitting diode 11 thereof towards the front (the front windshield 2) of the vehicle 1, and raindrops are detected (that is, the amount of rainfall is estimated) based on the amount of light received when a portion of the emitted light is reflected by the front windshield 2 and made incident on the photodiode 12. It is possible for the rain sensor 10 to estimate the amount of rainfall based on the amount of received light because the reflectance of the light in the front windshield 2 and the amount of light received by the photodiode 12 vary depending on whether raindrops U are precipitating on the front windshield 2 or not.

However, in this system, when the vehicle has decelerated below a predetermined speed (in the present embodiment, A km/h) or the vehicle has accelerated above a predetermined speed after moving again after it has been confirmed that the vehicle had stopped based on the value (vehicle speed) measured by the speed sensor 17, the estimated amount of rainfall and the wiping frequency data at the point in time when a predetermined speed has been reached while accelerating or decelerating are compared, and the larger data of these is selected. Thereby, the wiping action frequency of the wiper 5 is determined. Note that in this embodiment, confirming that the vehicle has stopped is carried out when the value measured by the speed sensor 17 is equal to or less than B km/h. Here A and B have the relationship A>B.

Figure 3:
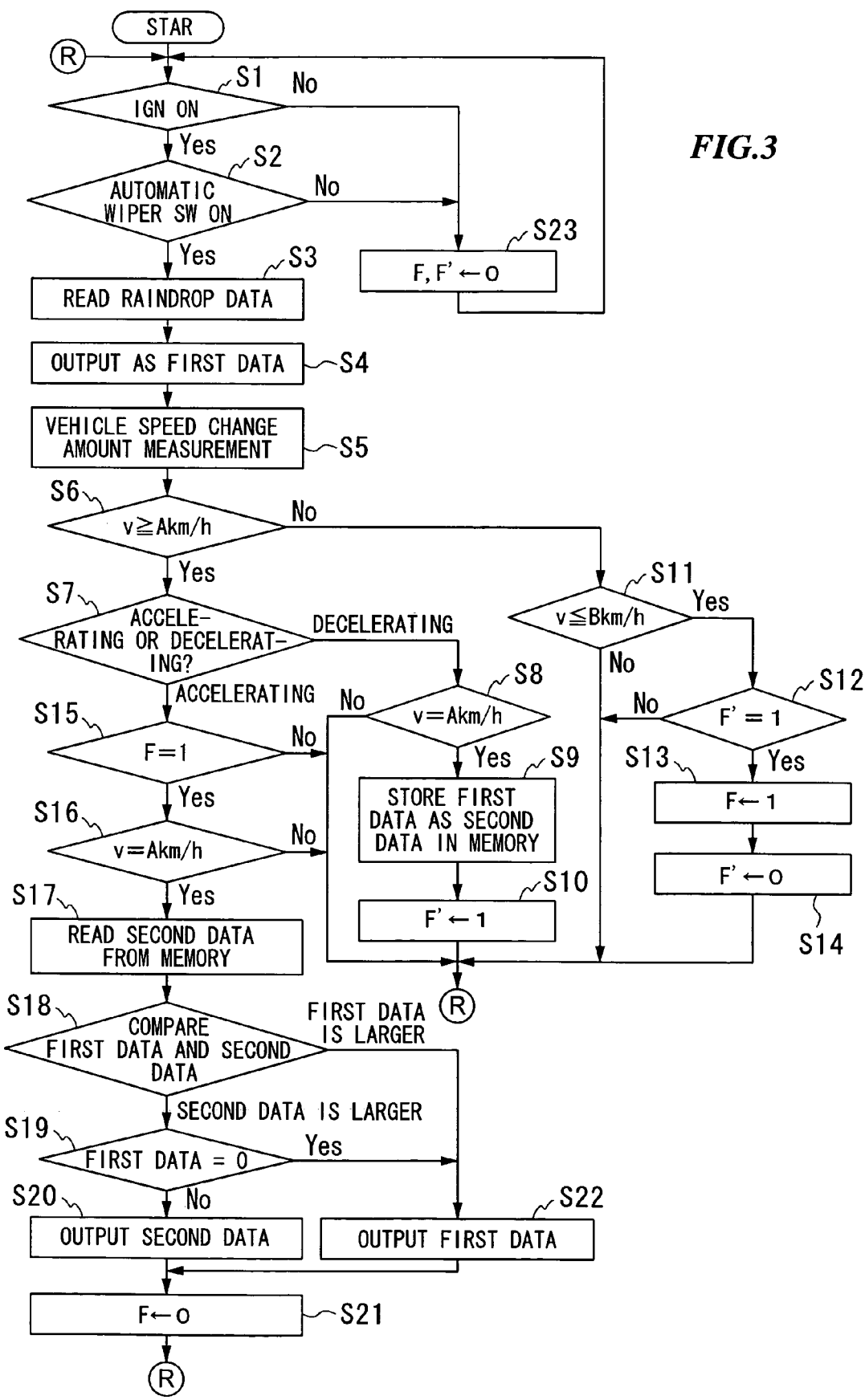
FIG. 3 is a flowchart showing the processing sequence during the determination of the wiping frequency in the system described above.

Below, the processing up to this determination will be explained based on the flowchart in FIG. 3. Note that this processing is repeatedly carried out during each brief time interval.

First, when the ignition is turned ON (Yes in step S1) and the automatic wiper switch is turned ON (Yes in step S2), the wiping frequency calculating portion 13 reads the raindrop data (the amount of received light, that is, the amount of rainfall) from the photodiode 12 (step S3) and outputs the estimated amount of rainfall, which is based on the raindrop data, and the wiping action frequency of the wiper 5, which has been calculated depending on this amount, to the wiping frequency determining portion 14 as first data (step S4). At the same time, the wiping frequency determining portion 14 measures the amount of change in the vehicle speed based on a signal from the speed sensor 17 (step S5). Note that the first data is updated to the most recent data each time this processing is repeated.

Next, the wiping frequency determining portion 14 determines whether or not the vehicle speed (v) is equal to or greater than A km/h (step S6). When it has been determined that the vehicle speed is equal to or greater than A km/h (Yes), then it is determined whether or not the vehicle is accelerating or decelerating based on the amount of change in the vehicle speed (step S7). At this time, when it has been determined that the vehicle is decelerating, it is further determined whether or not the vehicle speed is A km/h (step S8). When it has been determined that the vehicle speed is A km/h (Yes), the most recent first data is stored in the memory 15 as the second data (step S9). After a flag F' has been assigned the value 1 (step S10), the processing returns to step S1. Note that in step S8, when it has been determined that the vehicle speed is not A km/h (No), the processing returns directly to step S1.

Here, the state in which the flag F' is assigned 1 denotes the instant that the vehicle, which has started to decelerate from a state in which the vehicle is traveling at a speed equal to or greater than A km/h, reaches A km/h. In addition, the second data indicates the estimated amount of rainfall and the wiper frequency data at the instant the vehicle speed reaches A km/h after decelerating as described above.

In addition, after the flag F' is assigned 1, the processing starts again from step S1. In step S6, when it has been determined that the vehicle speed is less than A km/h (No), it is further determined whether or not the vehicle speed is equal to or less than B km/h (step S11). At this time, when it has been determined that the vehicle speed is equal to or less than B km/h (Yes), after it is confirmed that the flag F' has been assigned 1 (step S12), a separate flag F is assigned 1 (step S13). After the flag F' is reset to 0 (step S14), the processing returns to step S1. Note that when it has been determined in step S11 that the vehicle speed has exceeded B km/h (No), the processing returns directly to step S1.

Here, the state in which the flag F is assigned 1 denotes the state in which the vehicle continues to decelerate further from the state in which the flag F' was assigned 1 and the vehicle speed becomes equal to or less than B km/h (that is, the state in which it has been confirmed that the vehicle has stopped). Note that a determination of No in step S11 denotes the case in which the vehicle is traveling at a speed that is less than A km/h but greater than B km/h. In addition, in the case in which, for example, the vehicle continues to travel at a speed less than A km/h after the ignition is turned ON, it may be expected that with the flag F' remaining 0, the processing proceeds to step S12 will be effected. However, in such a case, step S12 is determined to be No, and the processing returns directly to step S1.

Furthermore, in the case in which the processing has started again from step S1 after the flag F has been assigned 1, and it has been determined that the vehicle is accelerating in step S7, it is confirmed that the flag F is assigned 1 (step S15) and it is determined whether or not the vehicle speed is A km/h (step S16). At this time, in the case in which it has been determined that the present vehicle speed is A km/h (Yes), the wiping frequency determining portion 14 reads the second data from the memory 15 (step S17), and the second data and the most recent first data are compared (step S18).

Note that when it has been determined that steps S15 and S16 are "No", there is the case in which the vehicle continues traveling at a speed that exceeds A km/h and the case in which, even when the vehicle speed is equal to or less than A km/h, the vehicle reaccelerates without decelerating to a speed equal to or less than B km/h (that is, it has not been confirmed that the vehicle has stopped).

In addition, in the case in which it has been determined that the second data read from the memory 15 is high (that is, the estimated amount of rainfall is large and the wiper frequency are high) with respect to the first data at the point in time when the vehicle speed is A km/h when the vehicle has started to move again after having been confirmed to have stopped, it is further determined whether or not the first data is 0 (step S19). When it has been determined that the first data is not 0 (No), an instruction signal corresponding to the second data is output to the wiper control unit 20 (step S20), and after the flag F is reset to 0 (step S21), the processing returns to step S1. Thereby, the wiping action of the wiper 5 is carried out depending on the estimated rainfall amount data stored during vehicle deceleration.

Here, in step S19, when it has been determined that the first data (the estimated amount of rainfall and the wiper frequency data) is 0 (Yes) (in other words, the case in which the rain sensor 10 does not detect any raindrops), the second data is cancelled, an instruction signal corresponding to the first data is output to the wiper control unit 20 (step S22), and after the flag F is reset to 0 (step S21), the processing returns to step S1. This means that if the first data is 0, there is a significant possibility that the rain stopped while the vehicle was stopped. In such a case, control is performed such that the wiper 5 is stopped based on the first data.

In contrast, in the case in which it has been determined that the first data is large with respect to the second data that has been read, an instruction signal corresponding to the first data is output to the wiper control unit 20 (step S21), and after the flag F has been reset to 0 (step S20), the processing returns to step S1. Thereby, the wiping action of the wiper 5 is carried out depending on the estimated rainfall amount data obtained when the vehicle starts to move again.

Note that in the processing steps described above, when either the ignition or the automatic wiper switch turns OFF (No in steps S1 and S2), each of the flags F and F' are reset to 0 (step S22), and the processing returns to step S1.

Figure 4:
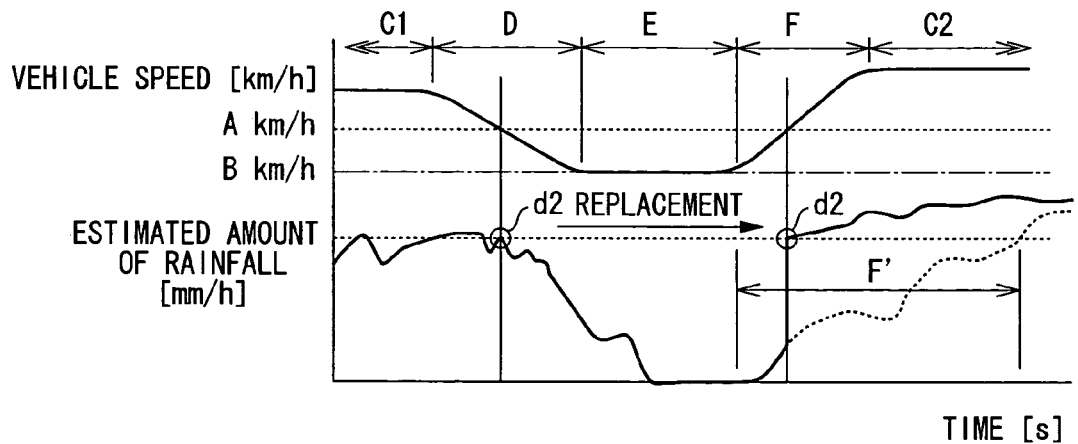
FIG. 4 is a graph showing the change over time of the vehicle speed and the estimated amount of rainfall in the system described above.
Figure 5:
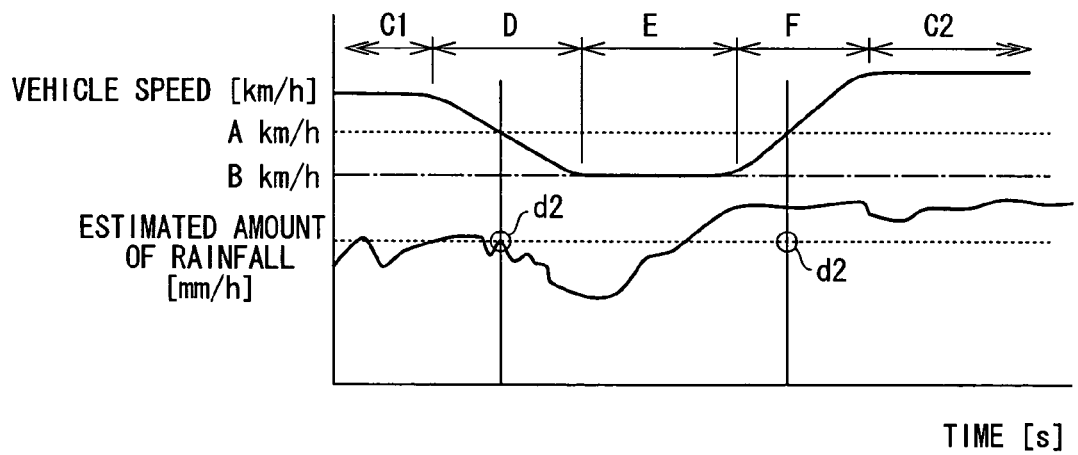
FIG. 5 is a graph showing another pattern of FIG. 4.

FIG. 4 and FIG. 5 are graphs showing the change over time in the vehicle speed and the estimated amount of rainfall, where the upper ordinate is the vehicle speed (km/h), the lower ordinate is the estimated amount of rainfall (mm/h), and the abscissa is time (s). The processing described above will be further explained with reference to each of these graphs.

First, as shown in FIG. 4, when the vehicle is traveling at a speed exceeding A km/h (below, referred to as normal travel) (the range shown by C1 in the figure), while the rain sensor 10 appropriately estimates the amount of rainfall, it calculates the wiping frequency corresponding thereto, and outputs an instruction signal to the wiper control unit 20.

Next, when the vehicle decelerates below A km/h from the state of normal travel described above (the range shown by D in the figure), at the point in time when the vehicle speed has reached A km/h, the present estimated amount of rainfall and wiping frequency data are stored in the memory 15 as second data.

Next, when the vehicle speed is equal to or less than B km/h (the range shown by E in the figure) as a result of the vehicle further decelerating, the flag F is assigned 1 to confirm that the vehicle has stopped. Here, in contrast to when the vehicle is traveling, the number of raindrops striking the rain sensor 10 decreases while the vehicle is stopped. Thus, if there is no increase or decrease in the actual amount of rainfall, the estimated amount of rainfall while the vehicle is stopped is low compared to the estimated amount of rainfall while the vehicle is traveling. Thereby, while the vehicle is stopped, the wiping action of the wiper 5 that corresponds thereto is carried out (that is, the wiping action of the wiper 5 that is less frequent in comparison to when the vehicle is traveling).

Here, after the vehicle has again accelerated above A km/h from a state in which the vehicle has stopped (the range shown by F in the figure), when the vehicle is carrying out normal travel (the range shown by C2 in the figure), a predetermined amount of time may be required before the amount of rainfall estimated by the rain sensor 10 shifts from the value that corresponds to the state in which the vehicle has stopped to a value that corresponds to the normal travel state (the range shown by F' in the figure). The reason for this is that normally the number of raindrops precipitating on the rain sensor 10 at the point in time when the vehicle has accelerated to A km/h is small in comparison to the amount of raindrops that precipitate on the rain sensor 10 at the point in time when the vehicle has decelerated to A km/h.

Thus, at the point in time when the vehicle speed reaches A km/h while the vehicle is accelerating, the present estimated amount of rainfall is replaced by the estimated amount of rainfall d2 of the second data. Thereby, even when the vehicle starts moving again from a state in which the vehicle has stopped, it is possible to obtain quickly the estimated rainfall amount data corresponding to the actual amount of rainfall. In other words, it is possible to carry out quickly the wiping action of the wiper 5 that corresponds to the actual amount of rainfall. Note that in the case that the estimated amount of rainfall is 0 at the point in time when the vehicle speed reaches A km/h while the vehicle is accelerating, the replacement by the estimated amount of rainfall d2 as described above is cancelled, and the wiper 5 is stopped based on the estimated amount of rainfall during acceleration.

In contrast, as shown in FIG. 5, when the amount of rainfall estimated by the rain sensor 10 while the vehicle is accelerating becomes larger than the estimated amount of rainfall d2 of the second data due to the amount of rainfall increasing while the vehicle was stopped, the wiping action of the wiper 5 is carried out using the estimated amount of rainfall during acceleration, without being replaced by the estimated amount of rainfall d2. Thereby, it is possible to carry out quickly a wiping action of the wiper 5 that corresponds to the actual amount of rainfall in the same manner as described above.

Figure 6:
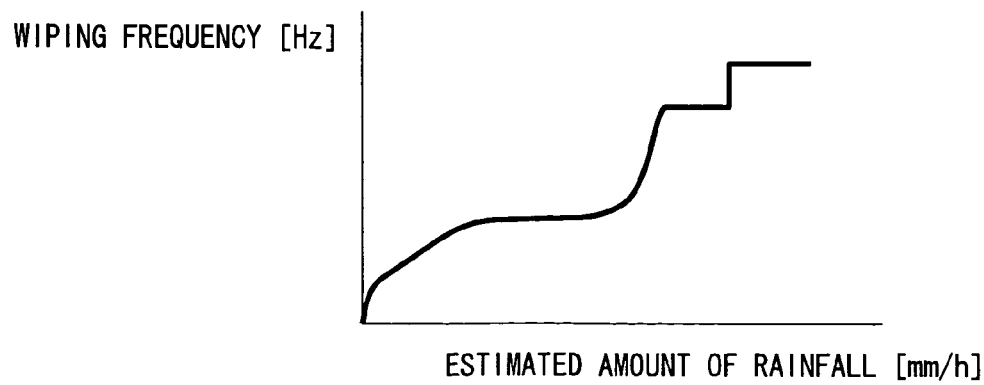
FIG. 6 is a graph showing the change in the wiping frequency of the wiper with respect to the estimated amount of rain.

FIG. 6 is a graph showing the change in the wiping frequency with respect to the estimated amount of rainfall, where the ordinate is the wiping frequency (Hz) of the wiper 5 and the abscissa is the estimated amount of rainfall (mm/h) of the rain sensor 10. As shown in the figure, the wiping frequency of the wiper 5 approximately increases stepwise along with the increase in the estimated amount of rainfall of the rain sensor 10. Note that the wiping frequency denotes the inverse of the cycle (s) for a wiping action of the wiper 5, and shows that the cycle for a wiping action of the wiper 5 becomes small as the wiping frequency becomes large (that is, the wiping frequency becomes high).

As explained above, the automatic vehicle wiper system in the embodiment described above determines the wiping action frequency of the wiper 5 based on signals from the rain sensor 10 and the speed sensor 17, wherein the rain sensor 10 detects raindrops during each predetermined interval and the wiping frequency calculating portion 13 calculates the wiping action frequency of the wiper 5 depending on the estimated amount of rainfall, and a memory 15 that stores the first data calculated by the wiping frequency calculating portion 13 as the second data when the detected value of the speed sensor 17 has decreased to equal to or less than a predetermined speed (A km/h). When the value measured by the speed sensor 17 becomes equal to or greater than a predetermined speed (A km/h) after it has been confirmed that the vehicle has stopped, the latest first data calculated by the wiping frequency calculating portion 13 and the second data stored in the memory 15 are compared, and the wiping action frequency of the wiper 5 is determined by the wiping frequency determining portion 14 based on the larger of these.

According to this structure, even when the vehicle starts to move (accelerate) again after having stopped, it is possible to perform the wiping action of the wiper 5 by comparing the wiping action frequency of the wiper 5 depending on the amount of rainfall when the vehicle has reached a predetermined velocity and the wiping action frequency of the wiper 5 depending on the amount of rainfall stored during deceleration before stopping and when the vehicle has reached a predetermined speed, and selecting the larger of these.

That is, even in the case in which the estimated amount of rainfall when the vehicle starts to move again after having stopped is smaller than the actual amount of rainfall because of the variance in frequency with which the raindrops will strike the rain sensor 10 and the like, it is possible to carry out the wiping action of the wiper 5 depending on the estimated amount of rainfall stored before the vehicle stopped. In addition, in the case in which the estimated amount of rainfall when the vehicle starts to move again is high due to the amount of rainfall increasing while the vehicle has stopped, it is possible to carry out the wiping action of the wiper 5 depending on the estimated amount of rainfall.

In this manner, because it is possible to carry out the wiping action of the wiper that corresponds to the actual rainfall conditions even when the vehicle is starting to move again after having stopped, the driver does not experience distress and it is possible to improve the usability of the wipers.

In addition, the automatic vehicle wiper system described above cancels the wiping action frequency based on the second data when the first data shows that there is no rainfall when the first data and the second data are compared.

According to this structure, in the case in which no rainfall is estimated while the vehicle is starting to move again after having stopped, it is possible to carry out wiper control based on the present first data.

That is, in the case in which the rain sensor 10 does not detect raindrops even after the vehicle has started to move again after it has been confirmed that the vehicle has stopped, because there is a significant possibility that the rain stopped while the vehicle was stopped. Thus, in such a case, even if the second data is high, it is cancelled, and by selecting the first data that has been compared to the second data, it is possible to carry out wiper control corresponding to a condition in which the rain is about to stop.

Thereby, as described above, it is possible to carry out wiper control that corresponds to the actual rainfall conditions, the driver does not experience distress, and it is possible to improve the usability of the automatic wiper.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An automatic vehicle wiper system, comprising:
   a wiper;
   a speed sensor which measures vehicle speed;
   a rainfall measuring device which measures amount of rainfall during predetermined intervals;
   a calculating device which calculates a wiping action frequency of the wiper as first data, depending on the amount of rainfall measured by the rainfall measuring device;
   a memory device which stores the first data calculated by the calculating device as second data when the vehicle speed measured by the speed sensor decreases to equal to or less than a predetermined value; and
   a wiping action frequency determining device which determines the wiping action frequency of the wiper by comparing the first data and the second data when the vehicle speed measured by the speed sensor becomes equal to or greater than a predetermined value after it has been confirmed that the vehicle has stopped.

2. An automatic vehicle wiper system according to claim 1, wherein the wiping action frequency determining device cancels the wiping action frequency based on the second data when the first data shows that there is no rainfall.

* * * * *